Oct. 26, 1965   L. J. MARTINO   3,213,778
COOKING APPARATUS FOR DEEP FAT FRYING
Filed June 4, 1962
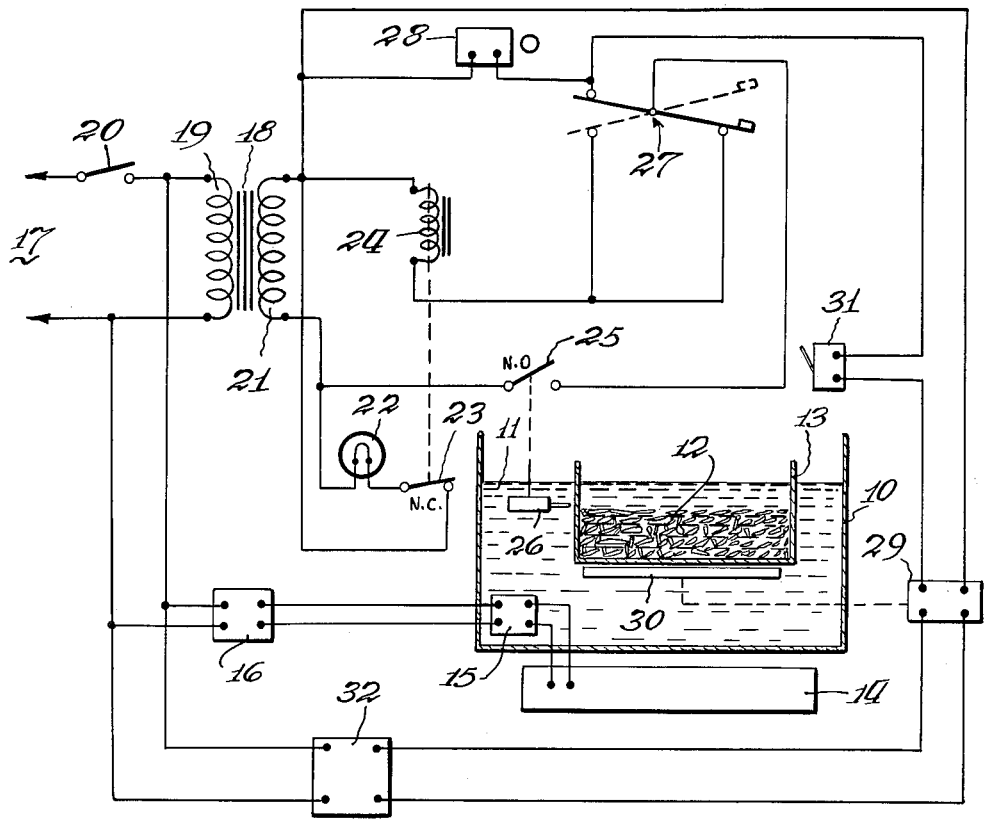
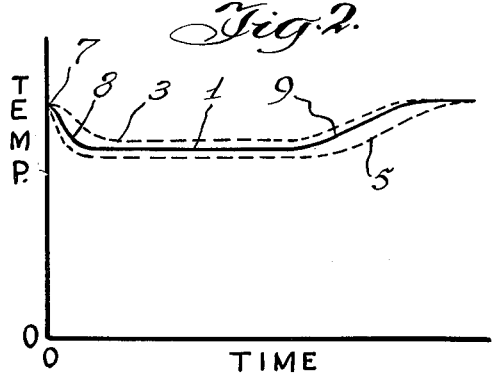
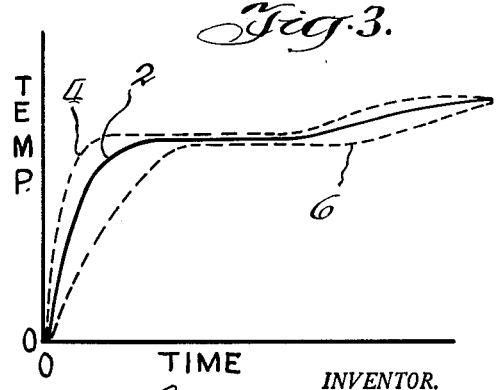
INVENTOR.
Louis J. Martino
BY
Schneider, Dressler, Goldsmith & Clement
attorneys 3,213,778
COOKING APPARATUS FOR DEEP FAT FRYING
Louis J. Martino, Lombard, Ill., assignor, by mesne assignments, to McDonald's System, Inc., Chicago, Ill., a corporation of Illinois
Filed June 4, 1962, Ser. No. 199,846
6 Claims. (Cl. 99—331)

The present invention relates to apparatus for controlling temperature. The invention is particularly adaptable to and enjoys successful utility in the field of cooking foods and food products, but may also be employed in numerous other environments. An illustrative embodiment of the invention is discussed hereinbelow in conjunction with cooking, but it should be understood that the scope of the invention is not limited to cooking.

One type of cooking which may be accomplished particularly successfully through the utilization of the instant invention is that type which is commonly known as french frying or deep fat frying. In this type of cooking, the food to be cooked is submersed in a heated oil or other similar cooking fluid having a boiling point substantially above the boiling point of water.

Hereinbelow the invention is described in conjunction with a particular manner of cooking potatoes and segments thereof, since it has been found that the invention is particularly advantageous for cooking vegetables of that type. These vegetables are also referred to herein as substantially solid pulp body vegetables. But it should be appreciated that many other foods and food products such as fruits, vegetables and animal, fish and fowl meat may be cooked in accordance with the procedure and by the system of this invention.

Since the invention is of general utility, the term "potato" and the various other terms used herein to refer to foods and food products are intended to be generic to all products which may be treated in accordance with the method and by the system of the present invention. Similarly, the term "cooking" is intended to be generic to all systems in which controlled heating of a product may be effected in accordance with this invention.

Commercial operations such as drive-in restaurants require high production, rapid cooking techniques in order to be competitive and profitable and in order to service the customers efficiently and rapidly. In many of these establishments, potatoes are precooked so that they may be submersed in hot oil for only a relatively short time immediately prior to being served.

The procedure generally followed for preparing and cooking potatoes to be served as french fried potatoes involves the following steps.

The potatoes, as received in the sack, are washed and peeled. Peeling is usually done in such devices as rotating roughened drum mechanisms. Then the potatoes are cut into elongated segments about one-quarter inch square and these are submersed in a tank of water wherein they are mechanically agitated, washed and soaked to remove the starch on the surface of the segments. If the surface starch is not removed, the potato segmenst tend to adhere to each other during the subsequent cooking operations.

During the washing and soaking stage, the potato segments absorb water, and if they are allowed to remain in the washing and soaking bath for a sufficient length of time, they become firm and rigid.

Raw potatoes have a moisture to solids content ratio in the range of from about 17% solids to about 25% solids. Most potatoes fall into the lower end of this range. While it is desirable that a potato have a sufficient water content to be substantially rigid and firm, potatoes having a high solids content are subject to minimum oil absorption during cooking and are generally more desirable for cooking since they cook more effectively and have a greater quantity of food value per pound.

The washing and soaking step, as noted above, adds moisture to the potato segments to cause the same to have the desired rigidity and firmness. It also removes the surface starches which otherwise tend to cause the potato segments to stick together when cooked.

Following washing and soaking, relatively small quantities of about one or two pounds per batch of potato segments are pre-cooked in a low temperature oil bath. Normally, the temperature of the oil bath is raised to about 280° F. in a quiescent state preparatory to pre-cooking. This pre-cooking step is normally referred to as blanching and is sometimes referred to by that term in parts of this specification.

Until the development of the instant invention, the precooking time and temperature conditions were determined by trial and error. When the potatoes had been cooked for a short time, they were removed from the precooking bath and permitted to cool to room temperature. Then they were placed in a second cooking bath and finish cooked. Following finish cooking, which was determined by the color of the outer surface of the potatoes, they were removed from the second bath and permitted to cool to room temperature. At that stage, random segments were extracted for test purposes. The testing included breaking a potato segment open to determine whether it had a white interior, was soft on the inside and rigid on the outside, and whether there was an excess of oil in the potato segment. Improperly cooked potatoes often had such an excess of oil therein that oil would run out of the broken segment when the segment was squeezed. As a final test determination, the finally cooked potato should be firm and remain crisp for at least fifteen minutes. If all of the desired conditions were not met, the precooking temperature and time were changed until at least most of the conditions are satisfied.

In general, it has been found that the precooking time and temperature are far more controlling of the ultimate condition of the finally cooked potato than are the conditions in the final cooking stage.

A number of variables affect those conditions. For example, potatoes with a higher percentage of solids content require less precooking time than do potatoes with a low percentage of solids content. Also, during precooking some of the water in the potatoes is boiled off and some fat or oil is absorbed. The rate at which this occurs affects the precooking parameters.

The desired result is a potato with a golden colored exterior, a white, substantially oil free interior with a minimum of oil inclusion, and a firmness which will be retained for at least fifteen minutes. It is recognized that during blanching a substantial amount of water is boiled off and some oil is absorbed. The amount of oil absorption, however, should be held to a minimum.

The present invention eliminates the guesswork and the trial and error methods employed for proper and effective precooking. By the present invention, precooking is accomplished in a controlled manner such that a uniform result occurs independent of the solids content of the potato, independent of the quantity of potatoes being cooked in any one batch, and independent of the various other conditions which affect the precooking parameters.

In a system embodying the instant invention the precooking bath is arranged so that the heat source is spaced from the region where the potatoes will be placed in the bath. Thus, the temperature of the bath immediately adjacent to the potatoes will decrease when the potatoes are immersed in the bath. Also, there will be a temperature gradient between the heat source and the potatoes. The magnitude of the gradient will depend upon a number of variables such as the type, condition and weight of the potatoes and the capacity of the heat source and its proximity to the potatoes. If the capacity of the heat source is sufficiently great, the temperature of the potatoes remains substantially constant at the reduced level for a time during which the precooking action takes place.

Because of the existence of the temperature gradient, the temperature of the bath immediately adjacent to the potato segments will begin to rise as the precooking nears completion. The direction of the rise will be toward a return to the originally selected temperature level for the bath. At that stage, the potatoes are fully precooked and should be removed from the bath. If the precooking is terminated at a selected incremental level of temperature rise of potatoes cooked in accordance with this invention will be uniformly precooked independent of the conditions that normally affect precooking.

Properly precooked potatoes require only resubmersion in a finish cooking bath having a temperature of about 325° F. for a few minutes to provide the potatoes with the desired golden color and rigid exterior. Potatoes cooked in this manner will have the desired properties of long time retention of crispness, a white interior and a minimum oil inclusion or absorption. The temperature gradient provides for the possibility of varying temperature of the potato segments and of the immediately surrounding portion of the cooking bath. Sensing either the temperature of the potatoes or the immediately surrounding bath permits control of the precooking since it permits sensing incremental temperature rises thereof. In accordance with the present invention, the foregoing incremental temperature rise is sensed so that the precooking may be terminated when that condition is reached.

The method and the system of the invention are described more fully below in conjunction with the drawings in which each and every detail shown is included as a part of this specification, and in which:

FIGURE 1 is a schematic illustration of a control system and apparatus forming an illustrative embodiment of this invention;

FIGURE 2 is a graph of a set of curves illustrating the changes in temperature in the cooking bath immediately adjacent to the potatoes submersed therein; and FIGURE 3 is a graph of a set of curves showing the temperature of the potatoes and the changes in such temperature while the same are submersed in the cooking bath.

When a batch of potato segments are submersed in a heated cooking bath such as lard or other animal oil or a vegetable oil, the temperature of the bath measured immediately adjacent to the potato segments, as shown in FIGURE 2, will decrease rapidly, within about one minute, to a low level which will remain substantially constant for a time, depending upon the character of the potatoes, the solids content thereof and the quantity of the potatoes. At the same time, the temperature of the potatoes themselves will rise rapidly as shown in FIGURE 2, to the plateau, precooking level and will remain substantially constant for a period of time following which the temperature will again rise slowly to the preselected temperature for the bath heat source system.

The construction characteristics of the heating bath and the heat source system are such that the heat source is controlled by variable thermostatic means. The heating mechanism for the heat source may be disposed within the bath or in the container for the bath or immediately adjacent to the container. In any event, the thermostatic control normally senses the temperature of the bath adjacent to the heat source and is so arranged that it increases or decreases output of the heat source to try, within the capacity of the heat source, to maintain a constant temperature in the oil bath adjacent to the heat source. Since the cooking area in the bath is spaced from the heat source, there will be a temperature gradient between the potatoes being cooked and the temperature of the bath where the temperature is being sensed for control of the heat source.

An average batch of potatoes of an average solids content will cook substantially along the time temperature curves shown in the solid line curves 1 and 2 of FIGURES 2 and 3. A lighter or smaller batch of potatoes or an average weight batch of potatoes but of higher solids content will precook in the time and at the temperature indicated by the upper dashed line curves 3 and 4 of FIGURES 2 and 3. Potatoes of lower solids content or larger or heavier batches will precook for times and at temperatures indicated generally by the lower dashed line curves 5 and 6 of FIGURES 2 and 3. If the heat source has a low capacity, the plateau regions of the curves will sag and approach a more exponential appearance. If the heat source has a very high capacity, the temperature of the plateau region will be flatter. The curves of FIGURES 2 and 3 are intended to be representative and are not intended to place a limitation upon the scope of the invention. A substantially flat precooking plateau portion for the curves is most desirable in precooking in accordance with the present invention.

With regard to FIGURES 2 and 3, as an example, it has been found that precooking of Idaho potatoes are most efficiently done if the initial bath temperature, point 7 in FIGURE 2, is about 275° F. When the potato segments are submersed in the oil cooking bath, the temperature will drop rapidly, as shown at 8, to the precooking plateau temperature of about 245° F. After a time period in the range of from about three minutes to about ten minutes, during which the temperature will remain substantially constant, the temperature will begin to rise, as shown at 9, to return to the initial desired bath temperature of about 280° F.

If the potatoes are removed from the bath during the temperature rise portion 9 of the time temperature curves, the precooking thereof will have been properly completed and they will remain until the final cooking, which is primarily a cooking to achieve the desired color characteristic for the aesthetic appearance of the potato.

A system for sensing and indicating the temperature changes and for operating in response to such temperature changes, forming an illustrative embodiment of this invention, is shown in the schematic diagram of FIGURE 1. There is shown in FIGURE 1 a cooking vat or tank 10 containing a sufficient quantity of a cooking fluid 11, such as the above described oils, to effect proper cooking of a batch 12 of potato segments. The potato segments are confined in a container 13 such as a wire basket which is set deeply enough into the bath to submerse the entire batch 12.

The oil bath may be heated by any convenient means such as an electric or gas heater in or immediately adjacent to the tank. For illustrative purposes, there is shown an electrically controlled heater 14 connected to temperature sensing means 15 and an electrical control 16 connected to a power source indicated generally at 17. The electrical control and temperature sensing devices may be in the nature of thermostatic elements and are arranged in such a manner that presetting the control unit 16 will provide for the maintenance of a substantially constant temperature in the bath 11 at least in the region of the temperature sensing unit 15, so long as the system is energized.

The control system for sensing and indicating the temperature in the bath immediately adjacent to the batch 12 of potato segments is also powered from the source 17 through a transformer 18, the primary winding 19 of which is connected to the power source 17 through a master on-off switch 20. The secondary winding 21 supplies low voltage power to the control system.

The control system includes interrelated subcircuits. One of these is an indicator circuit having a lamp 22, as an exemplary type of indicator, which is energized from the secondary winding through the contacts 23 of a relay 24 when the temperature in the bath adjacent to the batch of potato segments is below a preselected temperature. The relay 24 is energized from the secondary winding through a thermally controlled switch 25 operated by temperature or temperature differential sensing means 26 adjacent to the basket 13, and through a manual indicator shutoff switch 27. A second indicator or signaling device 28, which is actuated or energized when a predetermined temperature differential or rise occurs, is connected to the secondary winding through the manual switch 27 and through the thermally controlled switch 25.

The system also includes an automatic potato raising or removing motor drive arrangement which is connected in parallel with the signaling device 28 and includes a reversible motor 29. The motor is energized to raise the basket 13 on a platform 30 out of the cooking bath 11 when the temperature begins to rise from the precooking temperature level and continues to operate until the basket or platform strikes a normally closed limit switch 31. The motor may be reversed to return the platform to its lowered, potato cooking level by operation of an auxiliary reversing control 32 connected between the motor 29 and the power source.

The operation of the control system of FIGURE 1 is substantially as follows: the system is first energized by closing the master switch 20 and setting the predetermination cooking temperature level on the heater control 16. For cooking potatoes and other substantially solid pulp body type vegetables, the pre-set temperature is about 280° F. When that temperature has been reached, the basket 13 is loaded with precut potato segments for french frying and placed on the platform 30. Actuation of the reversing control 32 energized the motor to lower the potatoes into the cooking bath 11. The temperature condition of the cooking bath immediately adjacent to the basket of potato segment is sensed by the thermal differential sensing device 26 which may be a gas pressure bulb or a thermo-couple which operates through a relay to control movement of the thermally controlled, normally open switch 25.

The thermal device 26 also may be in the form of a probe to sense the thermal condition in or at the surface of the potato segments. With such an arrangement, the indicator system herein described could be disposed in the handle of the probe for a self-contained unit embodying the present invention.

When the temperature in the bath adjacent to the potato segments drops along the initial descent portion 8 of the time temperature curve of FIGURE 2 from the first pre-set level determined by the control 16, the switch 25 is opened. This deenergizes the relay 24 whereby the normally closed contacts 23 of the relay close to energize the lamp indicator 22. The lamp indicator remains energized throughout the entire precooking temperature plateau on the time temperature curve because the temperature of the thermal device 26 is insufficient to close the normally open switch 25.

At the end of the precooking cycle, the temperature begins to rise as indicated at 9, thereby energizing or actuating the thermal differential sensing device 26 to close the switch 25. This closes the circuit to the relay 24 through the switch 27 to open the contacts 23 and extinguish the lamp 22. It should be noted that the switch 27 has the blade thereof permanently connected to the switch 25 and is so connected that it provides a closed circuit connection from the switch 25 to the relay 24 independent of the two positions of the switch blade.

The switch blade is in the position shown in solid lines during the precooking operation so that it also provides a connection through the switch 25 to the buzzer indicator 28 and to the motor 29. Thus, when the switch 25 is closed, due to a rise in temperature at the thermal device 26, the indicator 28 and the motor 29 will be energized. Energization of the motor 29 will cause the platform 30 to rise until the limit switch 31 is actuated to open the circuit to the motor and stop the motor. The indicator 28 will continue to be energized, however, until the cook operates the switch 27 to move the blade thereof to the dashed line position shown in FIGURES 1, which will open the circuit to the indicator and to the motor.

When the cook has been made aware of the completion of the precooking by operation of the indicator 28, he may reload the platform 30 with a fresh batch of uncooked potato segments and lower the new batch into the cooking bath by operation of the motor controller 32. Since the temperature of the bath at the thermal device 26 immediately adjacent to the basket 13 descends rapidly to the precooking level, the cook may return the switch to the solid line position shown for the blade in the switch 27 almost immediately following operation of controller 32.

It will be appreciated that so long as the temperature of the bath immediately adjacent to the food being cooked is sensed and indicators are provided to make the operator or cook aware of the temperature rise which occurs at the conclusion of the precooking arrangement, the motor and automatic rising mechanism may be eliminated and the food may be removed from the bath manually.

It will also be appreciated that numerous other modifications and variations may be made in the control system. These include, as examples, the inclusion of such devices as variable reluctance networks, saturable reactor systems and bridge networks for temperature differential sensing and comparing the output of temperature sensing devices to control the indicators and the lifting mechanisms. It is important, however, that the systems employed sense the temperature rise which occurs at the conclusion of the precooking or at the end of the precooking temperature plateau of the time temperature curve, irrespective of the shape of the curve and the magnitude of the temperature drop at the beginning of the precooking cycle.

As noted above, the cooking of potatoes and potato segments has been referred to herein, but such reference has been intended primarily for purposes of exemplifying the present invention and an illustrative embodiment thereof. The invention is one of general utility and may be employed for controlled heating of various articles and for cooking and precooking of any food susceptible of submersion cooking. It is particularly adaptable, as also noted above, to the cooking and precooking of substantially solid pulp body vegetables. In addition to the above described modifications and variations to the method in the system and apparatus of this invention, numerous other modifications and variations may be effected without departing from the true spirit and scope of the novel concepts and principles of this invention.

I claim:

1. Cooking apparatus for the deep-fat frying of a food product comprising a frying tank adapted to contain a frying liquid, a frying basket adapted to contain a food product immersed in frying liquid in said frying tank, heating means for heating frying liquid to an elevated deep-fat frying temperature, temperature sensing means in said frying tank to contact with, and responsive to, the temperature of frying liquid at a location remote from said frying basket for continuously controlling said heating means and for maintaining an elevated deep-fat frying temperature, a temperature sensing probe adjacent said frying basket and remote from said temperature sensing means for continuously sensing a temperature condition of frying liquid adjacent said frying basket, said temperature condition being different from and less than said elevated deep-fat frying temperature, and means coupled to and uncoupleable from said temperature sensing probe to indicate, when coupled thereto an incremental temperature rise of said temperature condition of frying liquid from a lower temperature condition to a higher predeterminable temperature condition of frying liquid which higher predeterminable temperature condition is less than and different from said elevated deep-fat frying temperature.

2. A system for the controlled heating of a product comprising a heating tank adapted to contain a heating liquid, a basket adapted to contain a product in said heating tank, heating means spaced from said basket for heating heating liquid to an elevated temperature, temperature sensing means in said heating tank responsive to a temperature of heating liquid remote from said basket for controlling said heating means and for maintaining said elevated temperature, a temperature sensing probe adjacent said basket and remote from said temperature sensing means for continuously sensing a temperature condition of heating liquid adjacent said basket said temperature condition being different from and less than said elevated temperature, and electrical circuit means coupled to said temperature sensing probe including means for indicating an incremental temperature rise of the temperature condition of heating liquid to a higher predeterminable temperature condition from a lower temperature condition, which higher predeterminable temperature condition of heating liquid is less than and different from said elevated temperature, said electrical circuit means further including manually actuated switch means for opening the electrical circuit to said indicating means when the temperature condition sensed by said temperature sensing probe is greater than said higher predeterminable temperature condition.

3. Means for the controlled cooking of a product to a predetermined degree during a cooking cycle comprising a cooking tank adapted to contain a cooking liquid, means for supplying heat to cooking liquid, basket means adapted to contain a product to be cooked in said cooking tank remote from the means for supplying heat to cooking liquid, the existence of a product to be cooked in said cooking tank causing a temperature gradient in cooking liquid between said means for supplying heat and said basket means during a cooking cycle, a first temperature sensing means in said cooking tank remote from said basket means and adjacent said means for supplying heat for signalling deviations from a preselected temperature level for controlling said means for supplying heat during a cooking cycle, a second temperature sensing means in said cooking tank spaced from said first temperature sensing means, remote from said means for supplying heat and adjacent said basket means for sensing a temperature condition in the liquid to be contained by said cooking tank less than the temperature sensed by said first temperature sensing means during a cooking cycle, means including signalling means responsive to said second temperature sensing means for indicating an increase in the temperature sensed by said second temperature sensing means to a level at which a product contained by said basket means has been cooked to a predetermined degree, thereby to indicate the completion of a cooking cycle, the temperature sensed by said second temperature sensing means being less than the temperature sensed by said first temperature sensing means during a cooking cycle and at the completion of a cooking cycle, and switch means for said signalling means for permitting and preventing operation of said signalling means.

4. In a cooking apparatus for cooking a food product in which said apparatus includes a cooking tank adapted to contain cooking liquid, a cooking container in said cooking tank, regulatable heating means for heating cooking liquid to preselected elevated temperatures and thermosensitive means for sensing a temperature of cooking liquid remote from said cooking container for controlling said heating means and responsive to changes in a preselected elevated temperature, a temperature sensing means remote from said thermosensitive means and immediately adajacent said cooking container for sensing a temperature condition of cooking liquid in said cooking tank which is less than said preselected elevated temperature, said temperature sensing means being independent of said regulatable heating means, and electrical circuit means coupled to said temperature sesing means and responsive to the temperature condition sensed by said temperature sensing means, said electrical circuit menas including signalling means responsive to an increase in said temperature condition to a predetermined temperature level at which cooking of a food product has been completed and at which said temperature level is less than said preselected elevated temperature, said electrical circuit means also including manually actuated switch means for opening the circuit to said signalling means when the temperature condition sensed by said temperature sensing means is greater than said predetermined temperature level.

5. A system for the controlled cooking of a food product comprising a heating tank adapted to contain a cooking liquid, a cooking container in said heating tank, heating means for heating cooking liquid to a generally uniform elevated temperature, first temperature sensing means remote from said cooking container and responsive to a temperature of cooking liquid for controlling said heating means and for maintaining said elevated temperature, second temperature sensing means adjacent said cooking container and remote from said first temperature sensing means for continuously sensing a temperature condition of cooking liquid imediately adjacent said cooking container, said temperature condition being different from and less than said elevated temperature, and means coupled to and incoupleable from said second temperature sensing means to indicate, when coupled thereto, an incremental temperature rise in the temperature condition of cooking liquid adjacent said cooking container from a lower temperature condition to a higher predeterminable temperature condition which higher predeterminable temperature condition of cooking liquid is less than and different from said elevated temperature.

6. Cooking apparatus for indicating the completion of the deep-fat frying of potato segments comprising a frying tank adapted to contain a frying liquid, a porous frying basket within said frying tank, heating means for heating frying liquid in said frying tank to an elevated deep-fat frying temperature, temperature sensing means in said frying tank to contact with, and responsive to the temperature of, frying liquid remote from said frying basket for continuously controlling said heating means and for maintaining said elevated deep-fat frying temperature, a temperature sensing probe adjacent said frying basket and remote from said temperature sensing means for continuously sensing a temperature condition of frying liquid adjacent said frying basket, said temperature condition being different from and less than said elevated deep-fat frying temperature, means coupled to said temperature sensing probe to indicate an incremental temperature rise of said temperature condition of frying liquid from a lower temperature condition to a higher predeterminable temperature condition which higher predeterminable temperature condition of frying liquid is less than and different from said elevated deep-fat frying temperature, thereby to indicate the completion of the deep-fat frying of potato segments, and manually actuated means for rendering ineffective said means to indicate until said temperature condition adjacent said frying basket has decreased to below said higher predeterminable temperature condition.

References Cited by the Examiner

UNITED STATES PATENTS

| | | | |
|---|---|---|---|
| 1,836,641 | 12/31 | Brett | 99—325 |
| 2,043,360 | 6/36 | Townsend | 340—220 |
| 2,074,044 | 3/37 | Bushway | 99—329 |
| 2,108,298 | 2/38 | Scharf | 99—325 |
| 2,778,736 | 1/57 | Wagner | 99—1 |
| 2,827,379 | 3/58 | Phelan | 99—107 |

FOREIGN PATENTS 793,052   4/58   Great Britain.

WALTER A. SCHEEL, *Primary Examiner.*

HYMAN LORD, ROBERT E. PULFREY, *Examiners.*